United States Patent [19]

Krause

[11] Patent Number: 5,235,419
[45] Date of Patent: Aug. 10, 1993

[54] ADAPTIVE MOTION COMPENSATION USING A PLURALITY OF MOTION COMPENSATORS

[75] Inventor: Edward A. Krause, San Diego, Calif.

[73] Assignee: General Instrument Corporation, Hatboro, Pa.

[21] Appl. No.: 784,474

[22] Filed: Oct. 24, 1991

[51] Int. Cl.$^5$ .................... H04N 7/12; H04N 7/18
[52] U.S. Cl. .................... 358/135; 358/136; 358/105
[58] Field of Search ............... 358/135, 136, 133, 105

[56] References Cited

U.S. PATENT DOCUMENTS

| | | | |
|---|---|---|---|
| 4,802,006 | 1/1989 | Iinuma et al. | 358/135 |
| 4,816,906 | 3/1989 | Kummerfeldt et al. | 358/136 |
| 4,827,340 | 5/1989 | Pirsch | 358/136 |
| 4,897,720 | 1/1990 | Wu et al. | 358/136 |
| 5,068,724 | 11/1991 | Krause et al. | 358/133 |
| 5,091,782 | 2/1992 | Krause | 358/135 |
| 5,105,271 | 4/1992 | Niichara | 358/135 |
| 5,132,792 | 7/1992 | Yonemitsu et al. | 358/105 |
| 5,134,478 | 7/1992 | Golin | 358/105 |
| 5,138,447 | 8/1992 | Shen et al. | 358/105 |

FOREIGN PATENT DOCUMENTS 0237989  7/1987  European Pat. Off. .

OTHER PUBLICATIONS

Ninomiya and Ohtsuka, "A Motion-Compensated Interframe Coding Scheme for Television Pictures," *IEEE Transactions on Communications*, vol: COM-30, No. 1, Jan., 1982.

Primary Examiner—John K. Peng
Assistant Examiner—Glenton B. Burgess
Attorney, Agent, or Firm—Barry R. Lipsitz

[57] ABSTRACT

Digital video signals are adaptively compressed for communication to a receiver. A plurality of block-matching motion compensators, each using a different block size, compare current video image data to prior video image data. Video image data output from the motion compensators is compressed, and the compressed data from each motion compensator is compared to find which motion compensator results in the least amount of compressed data for a region of a current video image corresponding to the smallest of the block sizes. The compressed data having the lowest bit count is transmitted to a receiver for recovery of a motion vector. The recovered motion vector is used to recover current video image data from the transmitted data and previously received video image data.

21 Claims, 6 Drawing Sheets

ADAPTIVE MOTION COMPENSATION USING A PLURALITY OF MOTION COMPENSATORS

BACKGROUND OF THE INVENTION

The present invention relates to the compression of digital data, and more particularly to a system for processing digitized video signals for transmission in a compressed form.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

An example of a video compression system using motion compensation is described in Ninomiya and Ohtsuka, "A Motion-Compensated Interframe Coding System for Television Pictures," *IEEE Transactions on Communications*, Vol. COM-30, No. 1, January 1982. The motion estimation algorithm described therein is of the block-matching type. In this case, a motion vector is determined for each block in the current frame of an image by identifying a block in the previous frame which most closely resembles the particular block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimation algorithms are particularly effective when combined with block-based spatial compression techniques such as the discrete cosine transform (DCT).

Other examples of motion compensation systems can be found in U.S. Pat. No. 4,802,006 to Iinuma, et al., entitled "Signal Processing Unit for Producing a Selected One of Signals Predictive of Original Signals," U.S. Pat. No. 4,816,906 to Kummerfeldt, et al., entitled "Method for Motion-Compensated Frame-to-Frame Prediction Coding," U.S. Pat. No. 4,827,340 to Pirsch, entitled "Video-Signal DPCM Coder with Adaptive Prediction," U.S. Pat. No. 4,897,720 to Wu, et al., entitled "Circuit Implementation of Block Matching Algorithm," and European patent publication no. 0 237 989 to Takenaka, et al., entitled "Differential Coding Apparatus Having an Optimum Predicted Value Determining Circuit." In the '340 patent, adaptive differential pulse code modulation (DPCM) switching is effected on a block-by-block basis between different predictors, such as a two-dimensional intraframe predictor and a pure interframe predictor. The block sizes of the different predictors is the same.

Like most other motion estimation algorithms, the performance of the block-matching method is dependent on how well the movement from one frame to the next can be modeled as a simple translation. In television applications, movements may involve zooming, rotation, and many other complex distortions that cannot be accurately modeled as a simple translation. In such cases, compression artifacts are more likely to become visible since the accuracy of the prediction is reduced.

It would be advantageous to provide apparatus for improving the performance of motion compensated video signal compression systems, particularly when complex movements occur. The present invention provides such apparatus.

SUMMARY OF THE INVENTION

In accordance with the present invention, apparatus is provided for adaptively compressing digital video signals for transmission. A plurality of motion compensators is provided, each using a different block size to compare current video image data to prior video image data in accordance with a block-matching algorithm. Means are provided for compressing video image data output from each of the motion compensators. Means, coupled to the compressing means, compare the amount of compressed data resulting from each of the plurality of motion compensators for a region of a current video image corresponding to the smallest of the block sizes. Means responsive to the comparing means output a set of compressed data for the region that represents the least amount of compressed data resulting from one of the motion compensators for that region.

The different block sizes used by the motion compensators are advantageously related to the smallest block size by factors of $2^n$, where n is an integer. The comparing means can comprise a bit count comparator, to determine which motion compensator results in the smallest amount of data for the region. The apparatus of the invention can further comprise means for generating a code word identifying the motion compensator that results in the least amount of compressed data for the region. Means are provided for transmitting the compressed data output by the outputting means together with the code word.

In one embodiment of the invention, each of the motion compensators outputs a motion vector. The motion vector output from each motion compensator is compressed, and the bit count corresponding thereto is included with the compressed video image data for the corresponding motion compensator. In this manner, the amount of motion vector data is accounted for, and the comparing means can compare the amount of compressed video image data together with the amount of motion vector data resulting from each of the plurality of motion compensators. The comparing means then determine which motion compensator results in the least amount of compressed data overall.

In a more specific embodiment, a first motion vector output by one of the motion compensators is selected for use as a standard. This standard motion vector is transmitted regardless of which motion compensator produces the least amount of data for the region of the current video image being processed. A motion vector for each other motion compensator is combined with the first motion vector to provide a motion vector difference signal for each of the other motion compensators. The difference signals are input to the comparing means, so that the comparing means can consider the amount of data in the difference signals together with the amount of compressed video image data resulting from the corresponding motion compensator to determine which motion compensator results in the least amount of overall data (difference signal plus the compressed video image data) for the region. In a preferred embodiment, the difference signals are compressed prior to their input to the comparing means. The first motion vector can be, for example, the motion vector output from the motion compensator using the largest block size. Alternatively, where more than two motion compensators are provided, the motion vector for the next larger block size can be transmitted and used for differencing between each motion compensator and the motion compensator that uses the next larger block size.

A system is provided in accordance with the present invention for adaptively compressing digital video signals for communication to a receiver. A plurality of block matching compensators is provided, each using a different block size to compare current video image data to prior video image data in accordance with a block matching algorithm. The video image data output from each of the motion compensators is compressed. Means, coupled to the compressing means, compare the amount of compressed data resulting from each of the plurality of motion compensators for a region of a current video image corresponding to the smallest of the block sizes. Means responsive to the comparing means output the least amount of compressed data resulting from a motion compensator for said region. The outputted data is transmitted to a receiver. At the receiver, a motion vector is recovered from the transmitted data. Means responsive to the recovered motion vector recover current video image data from the transmitted data and previously received video image data.

In an illustrated embodiment, means are provided for encoding the outputted data, prior to transmission, with a code word indicative of the motion compensator from which the data is output. Means operatively associated with the receiver decode the transmitted data to recover the code word. The recovering means are responsive to the recovered code word for recovering the motion vector.

In one embodiment, each of the motion compensators outputs a motion vector. The motion vector output from each motion compensator is compressed, and its bit count is included with the compressed video image data resulting from that motion compensator. The comparing means then compare the amount of compressed video image and compressed motion vector data resulting from each of the plurality of motion compensators to determine which motion compensator results in the least amount of compressed data overall.

In a more specific embodiment, each of the motion compensators outputs a motion vector, and a first motion vector output by a designated one of the motion compensators is always transmitted to the receiver. The motion vector for each other motion compensator is combined with the first motion vector (or the motion vector for the next larger block size) to provide a motion vector difference signal for each other motion compensator. The difference signals are input to the comparing means. The comparing means then consider the amount of data in the difference signal for each motion compensator together with the amount of compressed video image data resulting from that motion compensator to determine which motion compensator results in the least amount of data for said region. At the receiver, the recovering means recover motion vectors other than the first motion vector by combining the first motion vector with a transmitted difference signal. The first motion vector and the difference signals can be compressed to reduce the amount of data transmitted to the receiver. At the receiver, the first motion vector and a received difference signal are decompressed. The designated motion compensator that produces the first motion vector can be the motion compensator using the largest block size.

Decoder apparatus in accordance with the present invention comprises means for receiving blocks of encoded video data. The encoded video data is provided by different motion compensators, depending on which motion compensator meets a selection criteria for a particular region of a video image defined by each block. Means coupled to the receiving means retrieve, from each received data block, a code word representative of a motion compensator from which the block is received. Means responsive to the code word recover a motion vector for each block from motion vector data received with the block. Means responsive to the motion vector recover current video image data from data provided by a current data block and at least one prior data block.

The motion vector recovering means of the decoder apparatus can comprise means for recovering a first motion vector provided by a first motion compensator. Means are also provided for recovering a motion vector difference signal provided by a second motion compensator. Means responsive to said code word selectively output the first motion vector alone or the first motion vector combined with the motion vector difference signal.

DETAILED DESCRIPTION OF THE INVENTION

The present invention provides an improvement in the performance of motion compensated video signal compression systems. The effectiveness of block-based motion estimation algorithms may be dependent on the size of the block that is used to match the current frame with the previous frame. A large block size will work well in regions where the image is still or translating uniformly. In such cases, a large block size is preferred to a small block size, since there is less overhead required to transmit the motion vectors associated with each of the image blocks. In applications requiring very high compression rates, the savings can be substantial. In other cases, where complex movements from one frame to the next cannot be accurately modeled as a simple translation, a small block size may perform better. The present invention takes advantage of these differences by providing a compression system using adaptive motion compensation, wherein a plurality of motion compensators using different block sizes are compared to determine which motion compensator results in the least amount of data, after compression, on a block-by-block basis.

Figure 1:
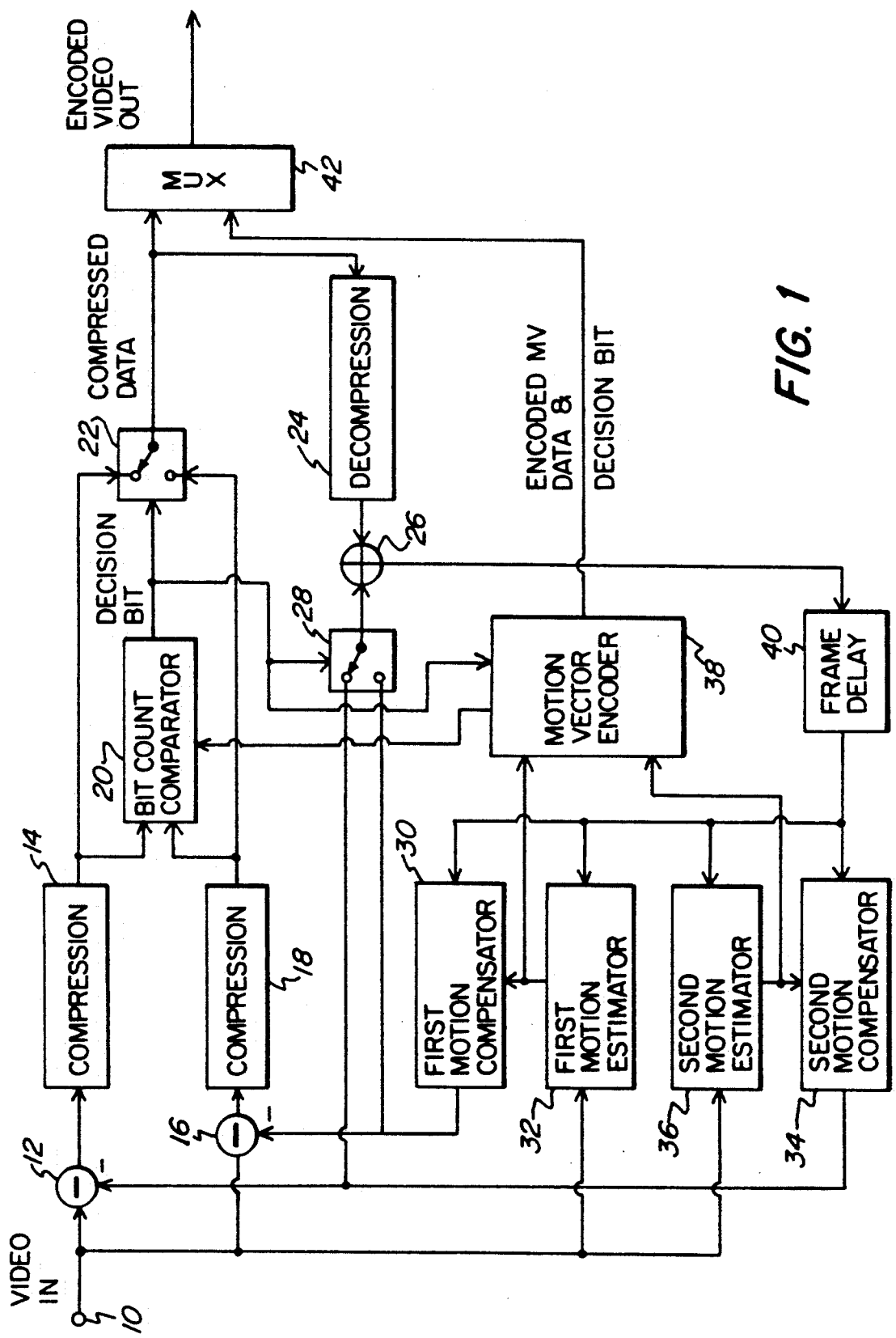
FIG. 1 is a block diagram of encoder apparatus in accordance with the present invention.

FIG. 1 is a block diagram of an encoder in accordance with the present invention, where two motion compensators using different block sizes are provided. For regions of a current video image corresponding to the smaller block size, a determination is made as to whether the motion compensator using a large block size or the motion compensator using a smaller block size is more efficient.

Figure 2:
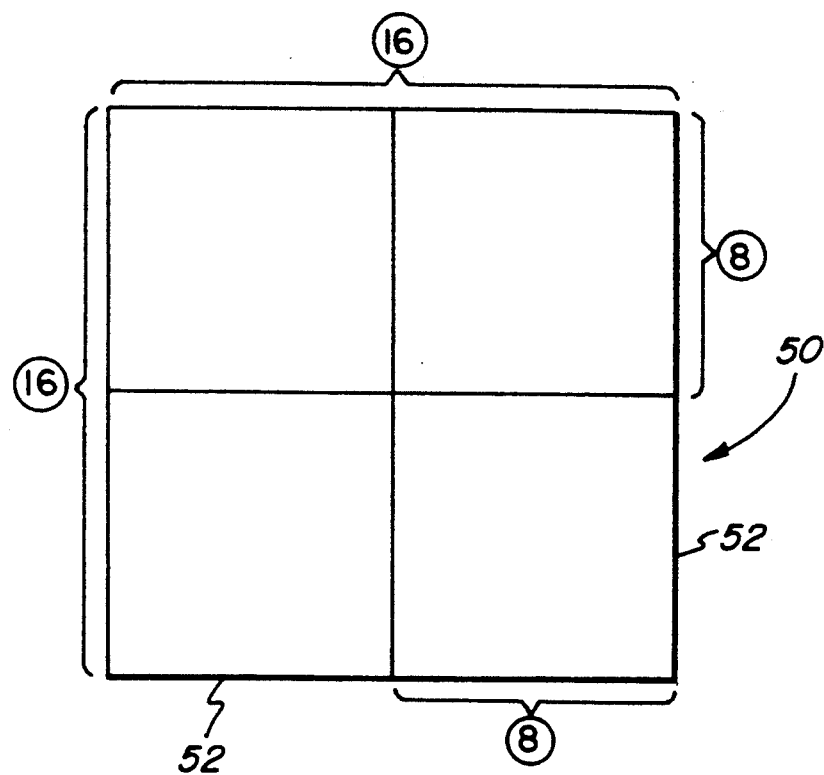
FIG. 2 is an illustration of two different block sizes that can be used by different motion compensators in accordance with the present invention.

Digitized video is input at a terminal 10, from which it is coupled to a subtracter 12, a subtracter 16, a first motion estimator 32, and a second motion estimator 36. First motion estimator 32 estimates the motion vectors in accordance with a block-matching algorithm using a first block size that is smaller than a block size used by second motion estimator 36. Two corresponding motion compensators, namely first motion compensator 30 and second motion compensator 34 are used to displace the image blocks using the estimated vectors. In the illustrated embodiment, the block size used by the second motion estimator 36 and the second motion compensator 34 is exactly twice the block size used by the first motion estimator 32 and the first motion compensator 30. In particular, as shown in FIG. 2, the first motion compensator/motion estimator uses an eight pixel by eight pixel block size 52. The second motion estimator/compensator uses a block size of sixteen pixels by sixteen pixels, generally designated 50. It will be appreciated that more than two motion compensator/estimators (hereinafter referred to generically as "motion compensators") can be provided, each using a different block size. For ease of implementation, the different block sizes used by the motion compensators are preferably related to the smallest block size by factors of $2^n$, where n is an integer.

Motion compensators of the type used in FIG. 1 are well known in the art. Examples of such devices can be found, for example, in the aforementioned U.S. Pat. No. 4,816,906 and the article to Ninomiya and Ohtsuka referred to above. An example of a block-matching algorithm can be found in the aforementioned U.S. Pat. No. 4,897,720.

A loop comprising decompression circuitry 24, adder 26, and frame delay 40 is provided as well known in the art of video signal motion compensation. Briefly, each motion compensator compares each block of current frame data to a search area of a previous video frame provided by frame delay 40, in order to locate the best match between the current frame block and a block within the search area of the previous frame. Only the difference between the best match blocks is transmitted, resulting in a substantial reduction in the amount of data that has to be transmitted whenever there is a correlation between the current frame and previous frame images.

In an alternate implementation, the previous frame input to the first motion estimator 32 and the second motion estimator 36 is obtained by delaying the original frame, instead of using the decompressed and reconstructed frame. The inputs to the first and second motion compensators 30, 34 would remain unchanged.

In accordance with the present invention, the best match data located by the first motion compensator is subtracted in a subtracter 16 from the current video data input at terminal 10. The resulting difference signal ("prediction error signal") is compressed in conventional compression circuitry 18 which can use, for example, the DCT compression algorithm. Similarly, the output from the second motion compensator is subtracted in a subtracter 12 from the input video data. The resulting prediction error signal is compressed in a compression circuit 14, which can use the DCT algorithm. A bit count comparator 20 receives the compressed prediction error signals from each of compression circuits 14 and 18. Motion vector overhead data is also input to bit count comparator 20 from motion vector encoder 38, so that any differences in the motion vectors transmitted for each of the first and second motion compensators can be accounted for in determining which motion compensator results in the least amount of compressed data for transmission.

The decision on which block size to use is made on a block-by-block basis. That is, for each of the small blocks 52, a decision is made whether to use the motion vector produced by the first motion estimator 32 or whether to use the motion vector determined for the larger block region assumed by the second motion estimator 36. In the case where motion compensation using the small blocks results in the least amount of compressed data, a new motion vector will need to be transmitted each time the compressed data originating with the first motion compensator is selected. Where the second motion compensator results in the least compressed data for transmission, only one motion vector needs to be sent for every group of four blocks. In the case where the first motion compensator is used to process all four sub-blocks 52 corresponding to a larger block 50, the motion vector from the second motion estimator does not have to be transmitted at all. However, in the preferred embodiment, the motion vector from the second motion estimator 36 is always transmitted, and in the case where a small block processed by the first-motion compensator results in the least amount of compressed data for transmission, the motion vector from the second motion estimator is transmitted along with a motion vector difference signal generated by subtracting the motion vector produced by the second motion estimator from the motion vector produced by the first motion estimator. This implementation is discussed in greater detail below in connection with FIG. 4.

As noted, the decision as to whether to use the first motion compensator (small block size) or second motion compensator (large block size) is based on the amount of data produced after the residual errors from the motion compensators are compressed. The method which produces the least amount of data is determined by bit count comparator 20.

Figure 3:
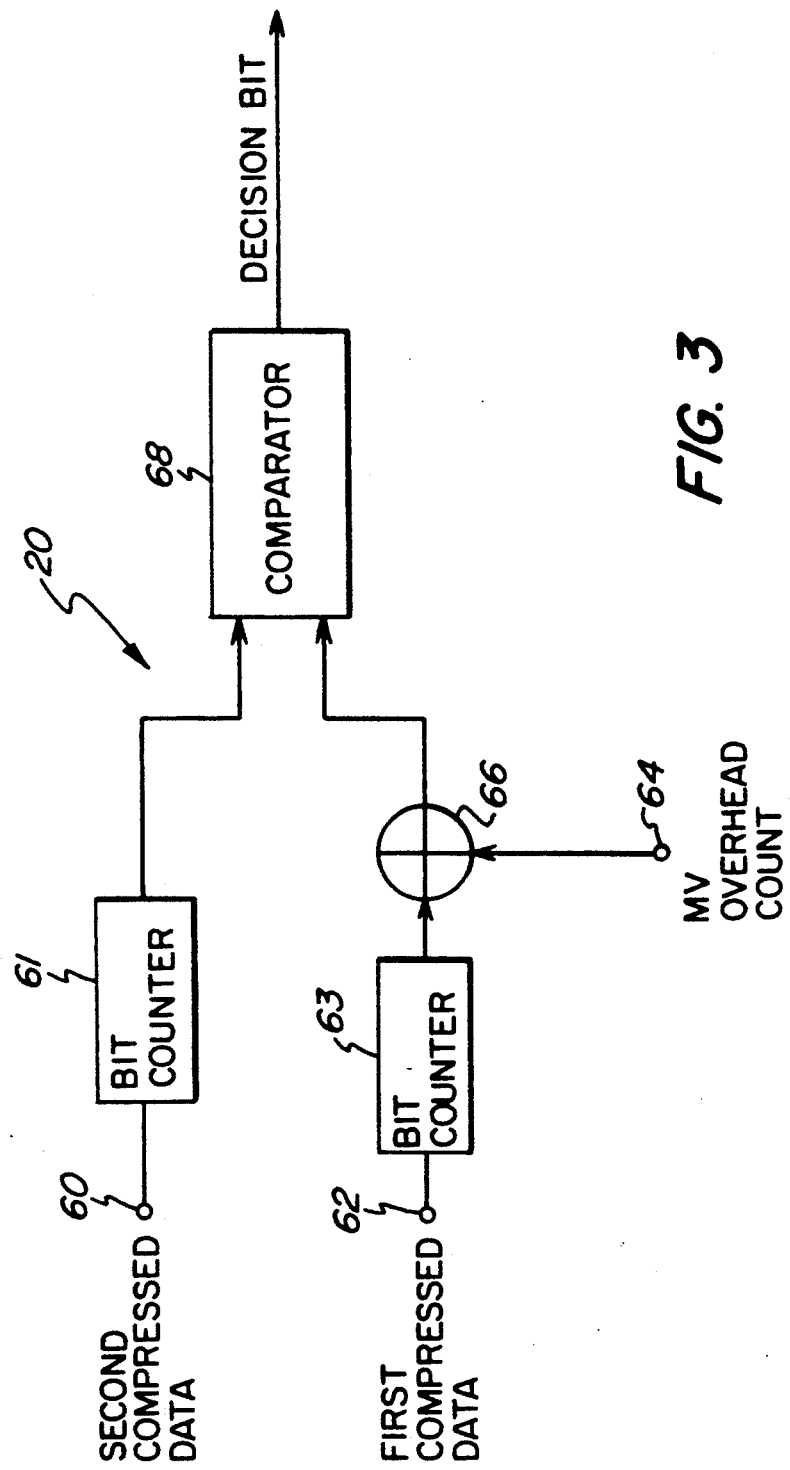
FIG. 3 is a block diagram of the bit count comparator illustrated in FIG. 1.

An example of a bit count comparator that can be used in accordance with the present invention is illustrated in FIG. 3. In this implementation, it is assumed that the motion vector corresponding to the second motion estimator is always transmitted even if the smaller block size is selected for each of the four sub-blocks. Then, in those cases where the small block size is selected, it is only necessary to send the difference between the motion vector produced by the first motion estimator and the motion vector that is always transmitted. Since this difference is usually small and therefore easily compressed, the overhead associated with the selection of the smaller block size is reduced.

Bit count comparator 20 illustrated in FIG. 3 receives the data from the compression circuitry 14 at input terminal 60 and determines the length of the compressed data string using bit counter 61 ("second compressed data count"). The compressed data from compression circuitry 18 is received at input terminal 62 and the length is determined by bit counter 63 ("first compressed data count"). A motion vector overhead count is input at terminal 64 to be summed with the first compressed data count in a summer 66. The result is compared to the second compressed data count by a comparator 68, that outputs a decision bit indicative of which of the inputs to the comparator has the lowest bit count.

Figure 4:
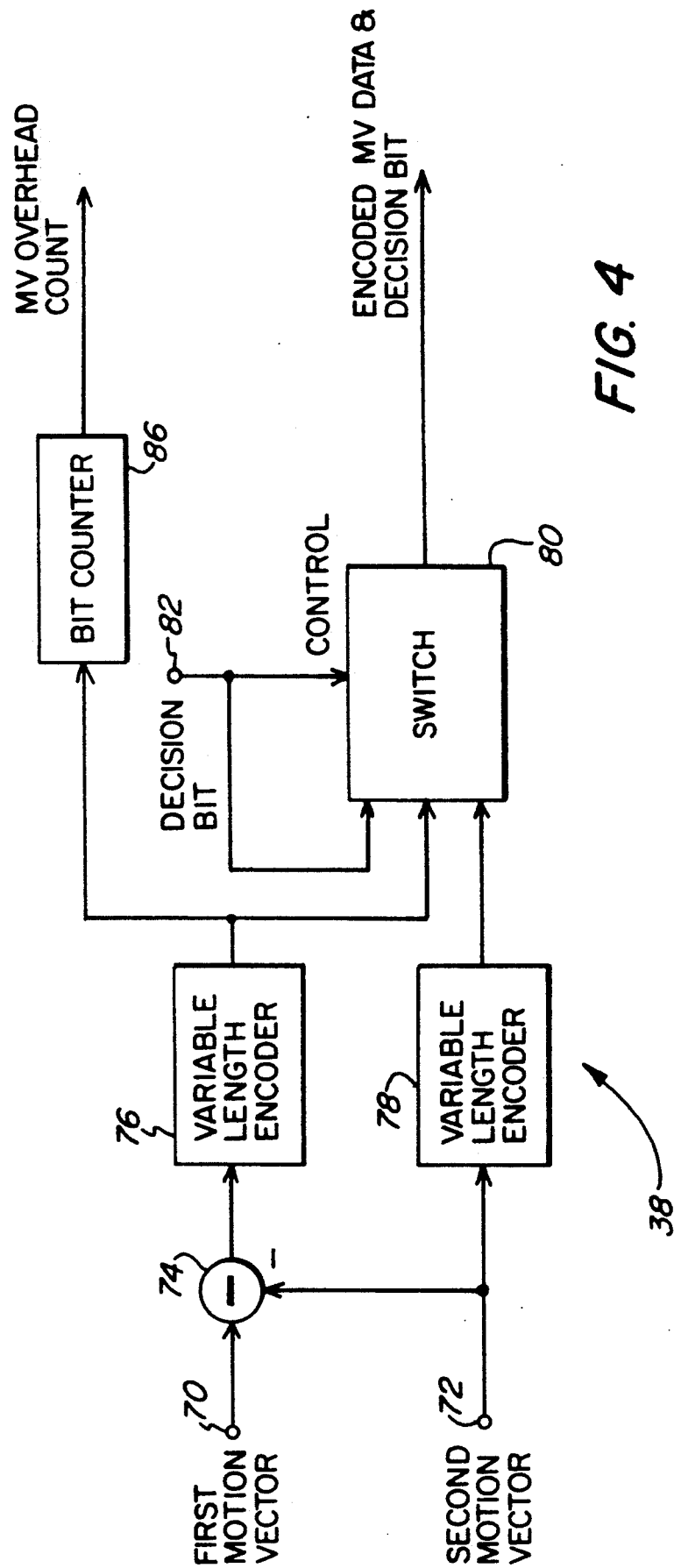
FIG. 4 is a block diagram of the motion vector encoder illustrated in FIG. 1.

The amount of overhead associated with the selection of the smaller block size ("MV overhead count") is determined by the motion vector encoder 38 of FIG. 1, shown in greater detail in FIG. 4. The motion vector encoder receives a first motion vector from first motion estimator 32 via input terminal 70. A second motion vector is received on input terminal 72 from the second motion estimator 36. The second motion vector is coupled directly to a variable length encoder 78, where it is compressed in a conventional manner. The second motion vector is also subtracted from the first motion vector in a subtracter 74 to provide a motion vector difference signal to variable length encoder 76, which compresses the difference signal. The encoded difference signal from variable length encoder 76 is applied to a switch 80 and to a bit counter 86. Bit counter 86 counts the number of bits in the encoded difference signal to provide the MV overhead count to the bit count comparator 20 illustrated in FIG. 3. Switch 80 also receives the encoded second motion vector from variable length encoder 78.

The decision bit output from the bit count comparator is coupled to switch 80 via input terminal 82. The decision bit is used to control the actuation of switch 80, and is also provided as an input to the switch where it is appended to the encoded motion vector data. When the decision bit indicates that the first motion compensator results in the least amount of compressed data, switch 80 is actuated to output the encoded data from variable length encoder 76 for transmission to a receiver. Conversely, switch 80 is actuated to output the encoded data from variable length encoder 78 once during each interval corresponding to the time it takes to process one 16×16 block or four 8×8 blocks. Four decision bits are also selected by switch 80 during the same time interval. Those skilled in the art will appreciate that the decision bits may also be compressed by variable length encoding. As indicated in FIG. 1, the encoded motion vector data and decision bits from switch 80 are combined in a multiplexer 42 with the compressed data from either compression circuit 14 or compression circuit 18, depending on the actuation of switch 22 by the decision bit output from bit count comparator 20. As indicated in FIG. 1, the decision bit also actuates a switch 28 to apply the correct motion compensator output to summer 26 in the motion compensation loop.

Bit counter 86 (FIG. 4) counts the actual number of bits output from variable length encoder 76 to determine the motion vector overhead required when the first motion compensator is selected as the one that results in the least compressed data for transmission. The motion vector overhead count from bit counter 86 is factored into the decision as to which motion compensator results in the least compressed data, as explained above in connection with the bit count comparator circuit of FIG. 3. In particular, the motion vector overhead count is added to the data count resulting from the compression process corresponding to the smaller block size. The sum is compared to the data count that results from the use of the larger block size. The decision as to which motion compensator results in the lowest bit count is identified by the decision bit and used at both the transmitter and receiver end of the system. The motion vector data, which may or may not be compressed, contains all of the information needed to reproduce the motion compensation process at the decoder.

Figure 5:
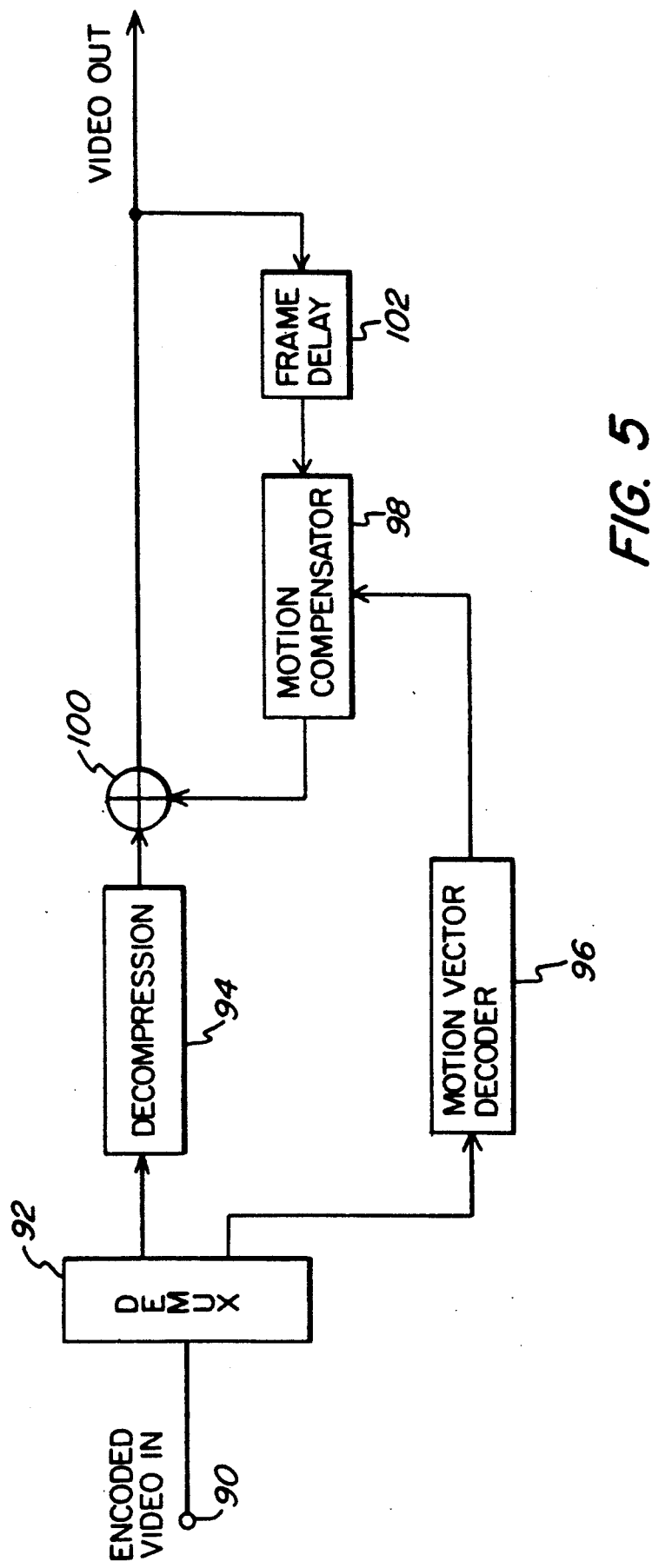
FIG. 5 is a block diagram of decoder apparatus in accordance with the present invention.

A block diagram of the decoder is provided in FIG. 5. The received encoded video, which corresponds to the encoded video output from multiplexer 42 of FIG. 1, contains the selected compressed data, the encoded motion vector data, and the decision bits. The multiplexed data is input at terminal 90 to a demultiplexer 92. The encoded motion vector data and decision bits are demultiplexed by demultiplexer 92 and input to a motion vector decoder 96. The compressed data recovered by demultiplexer 92 is input to a conventional decompression circuit 94, that can be identical to the decompression circuit 24 provided at the encoder.

The decompressed data output from circuit 94 is added to the appropriate previous frame data recovered by motion compensator 98 from a frame delay 102. This results in a reconstruction of the original video data, for output from summer 100.

Figure 6:
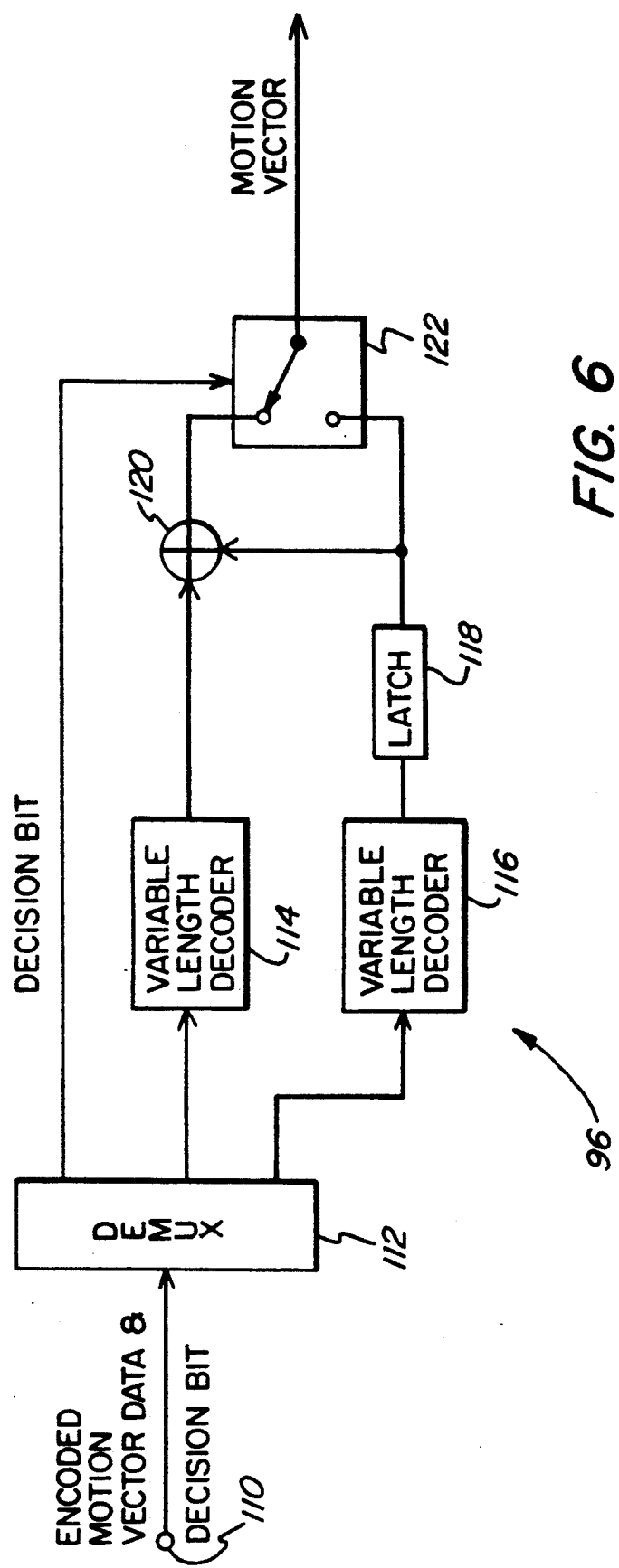
FIG. 6 is a block diagram of the motion vector decoder illustrated in FIG. 5.

FIG. 6 is a block diagram illustrating the components of motion vector decoder 96 in greater detail. The encoded motion vector data and decision bits from demultiplexer 92 (FIG. 5) are input at terminal 110 to a demultiplexer 112. The decision bit, first motion vector difference signal, and second motion vector are demultiplexed by demultiplexer 112. The decision bit is used to actuate a switch 122 to select either the reconstructed first motion vector or the second motion vector, as appropriate. The first motion vector difference signal is input to a variable length decoder 114, and summed at adder 120 with the second motion vector after it has been decoded by a variable length decoder 116. Latch 118 is used to store the received second motion vector for the equivalent of four sub-blocks, so that the second motion vector needs to be transmitted only once for every group of four smaller size blocks.

It should now be appreciated that the present invention provides a system for adaptively compressing digital video signals for transmission. A plurality of motion compensators, each using a different block size in conjunction with a block-matching algorithm, process video image data. The block sizes increase by factors of two among the successive motion compensators. In the general case, where the system includes N different block sizes, N motion estimators, N motion compensators, and N different compression subsystems are required. The selection of the optimum block size is determined by observing the amount of compressed data produced in each case and selecting a block size resulting in the least amount of data.

Although the invention has been described in connection with a specific embodiment, those skilled in the art will appreciate that numerous adaptations and modifications may be made thereto without departing from the spirit and scope of the invention as set forth in the claims.

I claim:

1. Apparatus for adaptively compressing digital video signals for transmission comprising:
   a plurality of motion compensators, each using a different block size to compare current video image data to prior video image data in accordance with a block matching algorithm;
   means for compressing video image data output from each of said motion compensators;
   means, coupled to said compressing means, for comparing the amount of compressed data resulting from each of said plurality of motion compensators for a region of a current video image corresponding to the smallest of said block sizes; and
   means responsive to said comparing means for outputting the least amount of compressed data resulting from a motion compensator for said region.

2. Apparatus in accordance with claim 1 wherein the different block sizes used by said motion compensators are related to the smallest block size by factors of $2^n$, where n is an integer.

3. Apparatus in accordance with claim 1 wherein said comparing means comprise a bit count comparator.

4. Apparatus in accordance with claim 1 further comprising:
   means for generating a code word identifying the motion compensator that results in the least amount of compressed data for said region; and
   means for transmitting the compressed data output by said outputting means together with said code word.

5. Apparatus in accordance with claim 1 wherein each of said motion compensators outputs a motion vector, said apparatus further comprising:
   means for compressing the motion vector output from each motion compensator; and
   means for accounting for the compressed motion vector data together with the corresponding compressed video image data for each motion compensator;
   whereby said comparing means compare the amount of compressed video image and motion vector data resulting from each of said plurality of motion compensators to determine which motion compensator results in the least amount of compressed data.

6. Apparatus in accordance with claim 5 wherein the different block sizes used by said motion compensators are related to the smallest block size by factors of $2^n$, where n is an integer.

7. Apparatus in accordance with claim 5 wherein said comparing means comprise a bit count comparator.

8. Apparatus in accordance with claim 5 further comprising:
   means for generating a code word identifying the motion compensator that results in the least amount of data for said region; and
   means for transmitting the data output by said outputting means together with said code word.

9. Apparatus in accordance with claim 1 wherein each of said motion compensators outputs a motion vector, said apparatus further comprising:
   means for selecting a first motion vector output by one of said motion compensators for use as a standard;
   means for combining the motion vector for each other motion compensator with said first motion vector to provide a motion vector difference signal for each other motion compensator; and
   means for inputting the difference signals to said comparing means, wherein said comparing means consider the amount of data in the difference signals together with the corresponding amount of compressed video image data in determining which motion compensator results in the least amount of data for said region.

10. Apparatus in accordance with claim 9 further comprising:
    means for compressing said difference signals for input to said comparing means.

11. Apparatus in accordance with claim 9 wherein said first motion vector is the motion vector output from the motion compensator using the largest block size.

12. Apparatus in accordance with claim 1 wherein each of said motion compensators outputs a motion vector, said apparatus further comprising:
    means for combining the motion vector for each motion compensator, other than the motion compensator using the largest block size, with the motion vector of the motion compensator using the next largest block size to provide a set of motion vector difference signals; and
    means for inputting the difference signals to said comparing means, wherein said comparing means consider the amount of data in the difference signals together with the corresponding amount of compressed video image data in determining which motion compensator results in the least amount of data for said region.

13. A system for adaptively compressing digital video signals for communication to a receiver comprising:
   a plurality of block matching motion compensators, each using a different block size to compare current video image data to prior video image data in accordance with a block matching algorithm;
   means for compressing video image data output from each of said motion compensators;
   means, coupled to said compressing means, for comparing the amount of compressed data resulting from each of said plurality of motion compensators for a region of a current video image corresponding to the smallest of said block sizes;
   means responsive to said comparing means for outputting the least amount of compressed data resulting from a motion compensator for said region;
   means for transmitting the outputted data to a receiver;
   means operatively associated with said receiver for recovering a motion vector from the transmitted data; and
   means responsive to the recovered motion vector for recovering current video image data from the transmitted data and previously received video image data.

14. A system in accordance with claim 13 further comprising:
   means for encoding the outputted data, prior to transmission, with a code word indicative of the motion compensator from which the data is output; and
   means operatively associated with said receiver for decoding the transmitted data to recover said code word;
   wherein said recovering means are responsive to said recovered code word for recovering said motion vector.

15. A system in accordance with claim 13 wherein each of said motion compensators outputs a motion vector, said system further comprising:
   means for compressing the motion vector output from each motion compensator; and
   means for accounting for the compressed motion vector data together with the corresponding compressed video image data for each motion compensator;
   whereby said comparing means compare the amount of compressed video image and motion vector data resulting from each of said plurality of motion compensators to determine which motion compensator results in the least amount of compressed data.

16. A system in accordance with claim 13 wherein each of said motion compensators outputs a motion vector, said system further comprising:
   means for transmitting a first motion vector output by a designated one of said motion compensators;
   means for combining the motion vector for each other motion compensator with said first motion vector to provide a motion vector difference signal for each other motion compensator; and
   means for inputting the difference signals to said comparing means; wherein:
   said comparing means consider the amount of data in the difference signals together with the corresponding amount of compressed video image data in determining which motion compensator results in the least amount of data for said region, and
   said recovering means recover motion vectors other than said first motion vector by combining said first motion vector with a transmitted difference signal.

17. Apparatus in accordance with claim 16 further comprising:
   means for compressing said first motion vector for transmission to said receiver;
   means coupled between said combining means and said inputting means for compressing said difference signals; and
   means for decompressing said first motion vector and a received difference signal at said receiver.

18. Apparatus in accordance with claim 16 wherein said designated motion compensator is the one using the largest block size.

19. A system in accordance with claim 13 wherein each of said motion compensators outputs a motion vector, said system further comprising:
   means for combining the motion vector for each motion compensator, other than the motion compensator using the largest block size, with the motion vector of the motion compensator using the next largest block size to provide a set of motion vector difference signals; and
   means for inputting the difference signals to said comparing means; wherein:
   said comparing means consider the amount of data in the difference signals together with the corresponding amount of compressed video image data in determining which motion compensator results in the least amount of data for said region, and
   said recovering means recover motion vectors other than that provided by the motion compensator using the largest block size by combining a transmitted difference signal with a motion vector from which the difference signal was derived.

20. Decoder apparatus comprising:
   means for receiving blocks of encoded video data, provided by different motion compensators depending on which motion compensator meets a selection criteria for a particular region of a video image defined by each block;
   means coupled to said receiving means for retrieving, from each received data block, a code work representative of a motion compensator from which the block is received;
   means responsive to said code word for recovering a motion vector for each block from motion vector data received with the block; and
   means responsive to said motion vector and common to data blocks provided by any of said different motion compensators for recovering current video image data from data provided by a current data block and at least one prior data block.

21. Decoder apparatus in accordance with claim 20 wherein said motion vector recovering means comprise:
   means for recovering a first motion vector provided by a first motion compensator;
   means for recovering a motion vector difference signal provided by a second motion compensator; and
   means responsive to said code word for selectively outputting said first motion vector alone or said first motion vector combined with said motion vector difference signal.

* * * * *